(12) United States Patent
Fortuna et al.

(10) Patent No.: US 11,524,240 B1
(45) Date of Patent: Dec. 13, 2022

(54) VIRTUAL DOJO

(71) Applicant: Sony Interactive Entertainment LLC, San Mateo, CA (US)

(72) Inventors: Ellana Fortuna, San Mateo, CA (US); Elizabeth Juenger, San Mateo, CA (US); Sarah Karp, San Mateo, CA (US); Jennifer Sheldon, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/404,608

(22) Filed: Aug. 17, 2021

(51) Int. Cl.
*A63F 13/67* (2014.01)
*A63F 13/833* (2014.01)
*A63F 13/798* (2014.01)

(52) U.S. Cl.
CPC ............ *A63F 13/67* (2014.09); *A63F 13/798* (2014.09); *A63F 13/833* (2014.09)

(58) Field of Classification Search
CPC ........ A63F 13/67; A63F 13/798; A63F 13/833
See application file for complete search history.

(56) References Cited

U.S. PATENT DOCUMENTS

| | | | | |
|---|---|---|---|---|
| 6,966,832 | B2 * | 11/2005 | Leen | G07F 17/3244 463/16 |
| 7,452,273 | B2 * | 11/2008 | Amaitis | A63F 1/06 463/16 |
| 9,108,108 | B2 * | 8/2015 | Zalewski | A63F 13/47 |

* cited by examiner

*Primary Examiner* — Reginald A Renwick
(74) *Attorney, Agent, or Firm* — Polsinelli LLP

(57) ABSTRACT

A method and system for assisting a play is disclosed. A gameplay of a user of media content that is associated with a game type is received. A skill involved in the gameplay of the user is determined based on the gameplay of the user and the game type. A skill level of the user is determined based on the gameplay of the user. A training curriculum is provided to the user based on the skill and the skill level of the user upon detecting a triggering event.

20 Claims, 13 Drawing Sheets

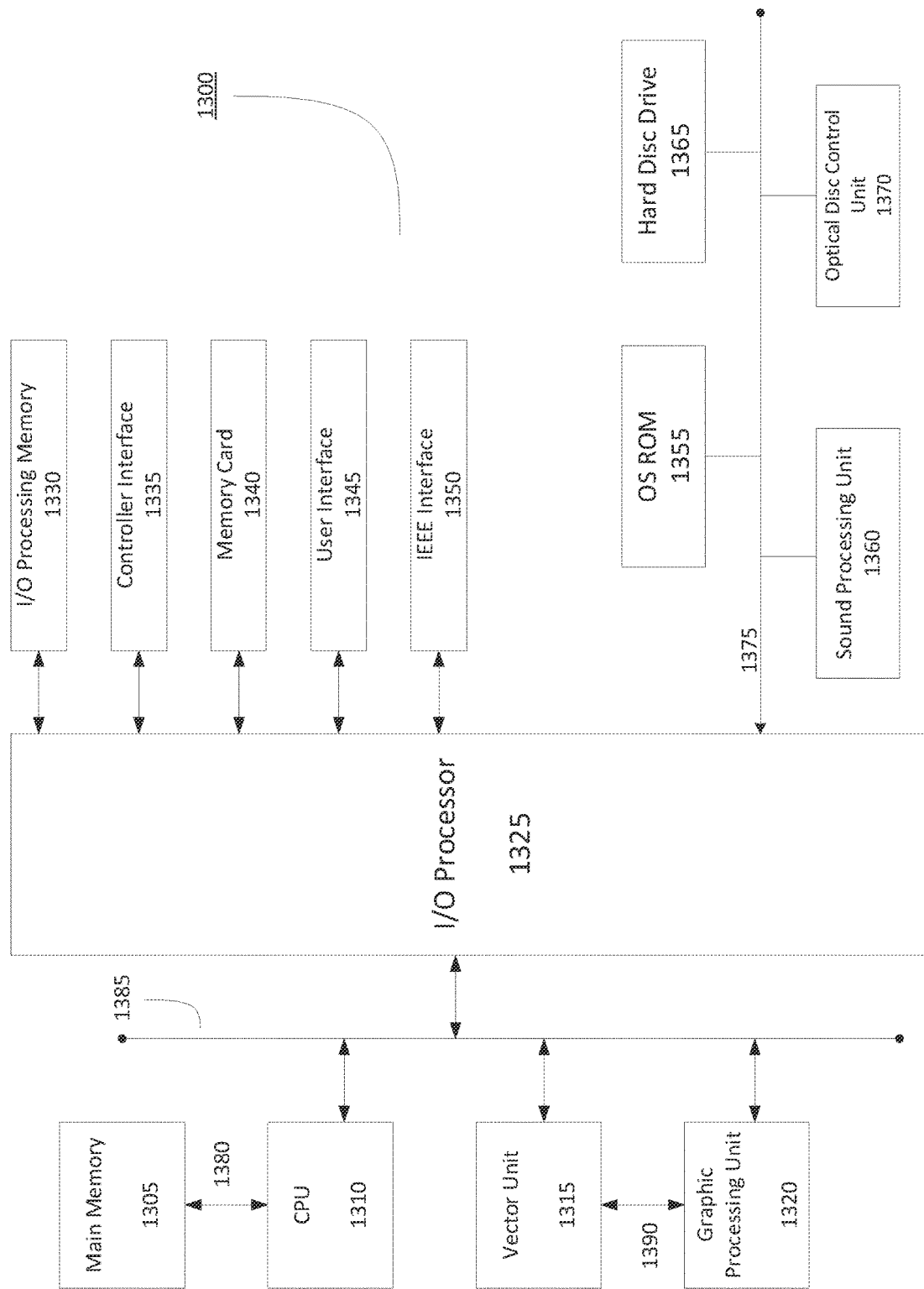

VIRTUAL DOJO

BACKGROUND OF THE INVENTION

1. Field of Invention

The present invention generally relates to providing cross-functional skill training and game specific information during a game. More specifically, the present invention relates to providing a training dashboard where a user may practice cross-functional skills related to a variety of games and access in-game information without interrupting user engagement.

2. Description of the Related Art

Presently available interactive media such as a video game may be associated with tutorials regarding the mechanics or details about a game title. The same tutorial, supplemental information (e.g., combo guide, map, or other resource), or other training materials may be accessed in a context external to a gameplay session. For example, a user who is having difficulty with a particular level or challenge in a game may pause the gameplay session and retrieve such training materials. Depending on the user's memory and familiarity with gameplay, the gaming platform and other hardware, the game title, and other factors, the user may need to reference such training materials repeatedly in order to improve their gameplay.

Moreover, users that are new or unfamiliar with gameplay may not even be aware of the availability of training materials, may find it difficult to identify and retrieve relevant training materials, and/or may be frustrated by the need to continually start and stop gameplay to access the training materials. For example, a user may stop or pause gameplay and only resume gameplay after days or weeks have elapsed. In such a case, a user may forget details that were previously presented in the training materials. Such a user may find some mechanics or details challenging to remember, such as difficult combos and sequences of button inputs, or a detailed map with object locations and markers. It may be that the user may be struggling with a particular genre of game, game mechanic, or style of gameplay and wish to improve their skill set and apply those skills to other similar games. Such struggles may result in frustration for a user who may have difficulty remembering details or complex combos.

Therefore, there is a need to provide a customized user dashboard that facilitates acquisition of skills and distribution of related information associated with the primary gameplay of a user simultaneously or asynchronously during gameplay.

SUMMARY OF THE CLAIMED INVENTION

A method for assisting a play of a game is disclosed. The method includes receiving a gameplay of a user of media content that is associated with a game type. The method also includes determining a skill involved in the gameplay of the user based on the gameplay of the user and the game type. A skill level of the user is determined based on the gameplay of the user. A training curriculum is provided to the user based on the skill and the skill level of the user upon detecting a triggering event.

A system for assisting a play of a game is disclosed. The system includes a memory and a processor that executes instructions stored in memory, wherein execution of the instructions by the processor receives a gameplay of a user of media content that is associated with a game type. The execution of the instructions by the processor also determines a skill involved in the gameplay of the user based on the gameplay of the user and the game type. A skill level of the user is determined based on the gameplay of the user. A training curriculum is provided to the user based on the skill and the skill level of the user upon detecting a triggering event.

A non-transitory computer-readable storage medium, having embodied thereon a program executable by a processor to perform a method for assisting a play is disclosed. The method includes receiving a gameplay of a user of media content that is associated with a game type. The method also includes determining a skill involved in the gameplay of the user based on the gameplay of the user and the game type. A skill level of the user is determined based on the gameplay of the user. A training curriculum is provided to the user based on the skill and the skill level of the user upon detecting a triggering event.

BRIEF DESCRIPTION OF THE DRAWINGS

FIG. 13 is a block diagram of an exemplary electronic entertainment system that may be used in embodiments of the present invention.

DETAILED DESCRIPTION

Embodiments of the present invention include systems and methods for providing customized training curricula. The method includes receiving a gameplay of a user of media content that is associated with a game type. The method also includes determining a skill involved in the gameplay of the user based on the gameplay of the user and the game type. A skill level of the user is determined based on the gameplay of the user. A training curriculum is provided to the user based on the skill and the skill level of the user upon detecting a triggering event.

Figure 1:
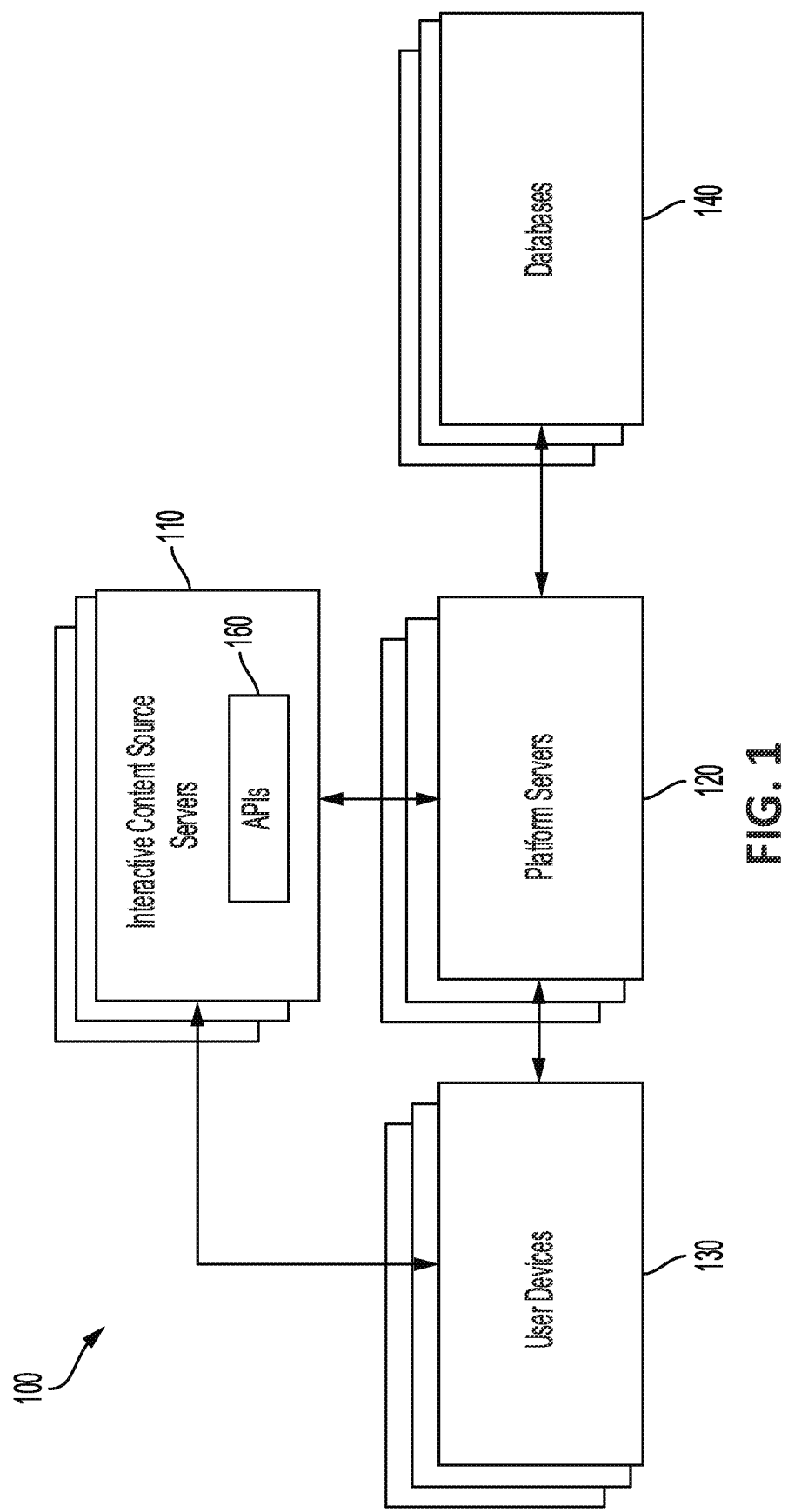
FIG. 1 illustrates an exemplary network environment in which a system for providing a custom training curriculum may be implemented.

FIG. 1 illustrates an exemplary network environment in which a system for providing a custom training curriculum may be implemented. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIG. 2.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). The user device may include one or more devices associated with a user or a user device capable of displaying on one or more screens.

The databases 140 may be stored on the platform server 120, the media streaming servers 110, any of the servers 218 (shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in or interact with. One or more user profiles may also be stored in the databases 140. Each user profile may include information about the user (e.g., user progress in an activity and/or media content title, user id, user game characters, etc.) and may be associated to media.

In an exemplary embodiment of the present invention, the user may be using user device 130 to access and engage in interactive content hosted by interactive content servers 110. During gameplay of a particular game title, for example, platform server 120 may analyze gameplay data and identify that the user may be struggling at a particular point (e.g., level, challenge, skill, or other element in virtual environment) in gameplay of the game title. Data regarding the particular in-game activity may also be captured (and described in further detail in relation to FIG. 2) and stored in database(s) 140. Platform server 120 may therefore analyze gameplay data from the current gameplay session in real-time. Such analysis may include evaluation in comparison to historical data of the user or of other similarly situated users in the same or similar game titles as stored in databases 140. A user may be identified a struggling, for example, based on such in-game factors as experience level, skill level, duration of time spent at the identified in-game point, as well as real-world data regarding real-time reactions by the user. The platform server 120 may use the activity data to filter and customize training materials and provide such materials to the user.

Figure 2:
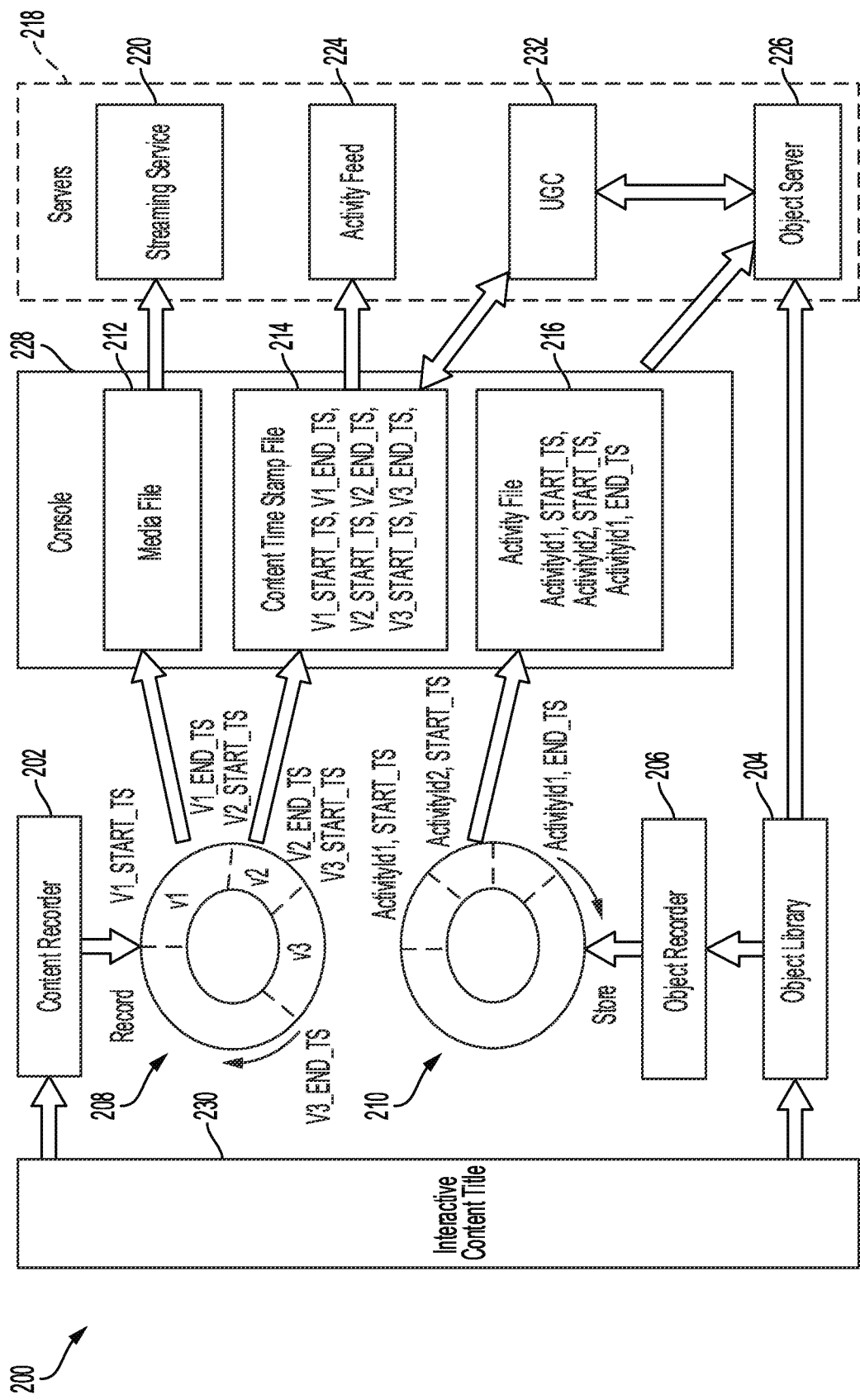
FIG. 2 illustrates an exemplary uniform data system (UDS) that may be used to provide data to a system for providing a custom training curriculum.

FIG. 2 illustrates an exemplary uniform data system (UDS) that may be used to provide data to a system for providing a custom training curriculum. Based on data provided by UDS, a virtual dojo server can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 130) and exemplary servers 218 (e.g., streaming server 220, an activity feed server 224, a user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END _TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

The activity files captured by UDS 200 may be accessed by the platform server 120 as to the user, the game title, the specific activity being engaged by the user in a game environment of the game title, and similar users, game titles, and in-game activities. Such data may be compared to data from the current gameplay session to identify with granularity how the user may be struggling. For example, the platform server 120 may identified that players successfully engaging in the same activity may have performed a particular move associated with a specific combination of input, while also identifying that user input appears to be similar but does not quite match the specific combo. The platform server 120 may therefore filter the available training materials to identify the materials relevant to the specific combo (e.g., controller layout with the specific input buttons marked or numbered, video of past players who used the combo, tips associated with the combo). The filtered training materials may further be provided to the user in accordance with a profile that includes express preferences and historical habits.

Figure 3:
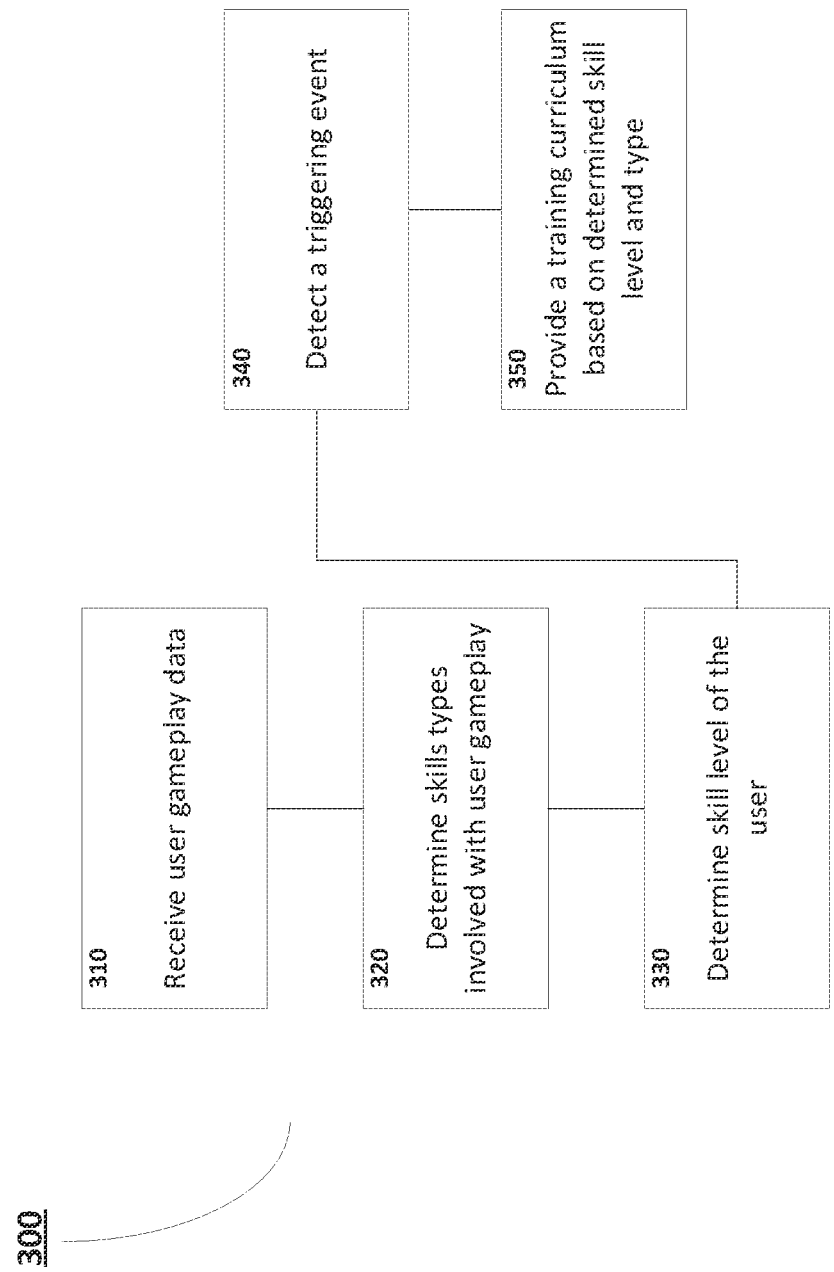
FIG. 3 is a flowchart illustrating an exemplary method for providing a custom training curriculum.

FIG. 3 is a flowchart illustrating an exemplary method for providing a custom training curriculum. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device. The exemplary process illustrated in FIG. 3 may be performed repeatedly during the play of a game.

In step 310, various information about the play of a game is sent by a UDS and received by a virtual dojo. User gameplay data may include a variety of specific and generic game information stored in the object file 216 of a UDS. Specific game information may include data such as types of skills used, success or failure count of using a skill or completing an activity, success or failure rate of using a skill or completing an activity, and online player versus player ranking information. Generic game information may include data such as total play time, total progress to completion of a game, and play time per session. Data received is generated during a user gameplay session and may be collected locally on a user device 130 or sent and received from platform servers 120 and databases 140. A UDS and virtual dojo may exchange information about the play of a game concurrent with active gameplay and alternatively after a game session has concluded.

In step 320, each identified skill, activity, ranking or other gameplay object received by the virtual dojo from step 310 may be categorized into skill types involved with user gameplay. A virtual dojo may combine data received from a UDS with metadata for a game received from interactive content servers 110 including data such as game genre or game type. Skill types may be utilized by a virtual dojo to further identify a user profile and gameplay in an individual game, genre, or in cross-genre skills by grouping similar interactions.

In one embodiment, a virtual dojo may determine skill types associated with an individual game. Determining skill types associated with an individual game may include categorizing unique game-specific interactions from the object file 216 that a user may experience in a game. For example, a virtual dojo may determine skill types in a game such as Spider-Man: Miles Morales in which the user takes control of the player character, Spider-Man, in an action-adventure style of gameplay. Skill types associated with the game may include attack combination skills and character movement skills for the player character that are unique to the game. A virtual dojo may determine skill types in Spider-Man: Miles Morales such as grouping character action abilities that cause the player character to interact with enemies like "Web Throw", "Venom Punch", and "Spin Cycle" as attack combination type skills. Further, a virtual dojo may categorize character action abilities that cause the player character to interact with the 3D environment for traversal but not interact directly with enemy characters like "Swing", "Web Zip" and "Wall Run" as character movement type skills.

In a different embodiment, a virtual dojo may determine skill types associated with genres of game or game types. Skill types associated with a game type may contain skills applicable to more than one game that share similar controls, objectives and activities. Game types include but are not limited to examples such as First-Person Shooter (FPS), Third-Person Shooter, 2-D Fighting, 3-D Fighting, Action-Adventure, Action-Roleplaying, Turn-based Roleplaying, Racing, Sports, Puzzle, Grand Strategy, Real-Time Strategy (RTS), Simulation, Platformer, Roguelike, Multiplayer Online Battle Arena (MOBA), Battle Royale, Stealth, Beat'em Up, and Horror. One game may be associated with more than one game type and may contain skills, activities, controls or objectives from each game type. A virtual dojo may utilize user gameplay data received in step 310 from a game a user interacts with to categorize skills related to each associated game type. Examples of game type skill categorization may include tracking skills, activities and objective completion in FPS games such as DOOM Eternal, Destiny 2, or Tom Clancy's Rainbow Six Siege. Gameplay skills such as aiming accuracy while firing a weapon, moving while firing a weapon, and awareness of enemies on a map in line of sight of the player may be skill types utilized in the play of DOOM Eternal, Destiny 2 and Tom Clancy's Rainbow Six Siege which contribute to each game being considered as part of the FPS game type. In this case, skill types such as aiming, moving while firing, and enemy awareness may be compared between any game type that includes the same skill types, even if the game also belongs to other game type categories. For example, Destiny 2 may also be determined to be a Role-Playing game type in addition to an FPS game type, as a game that includes skills related to player character progression, while Tom Clancy's Rainbow Six Siege may be determined to be a Real-Time Strategy game type in addition to an FPS game type as a game that includes skills related to real-time planning and use of resources to complete objectives. User interactions in both Destiny 2 and Rainbow Six Siege may be compared based on their similar FPS game type skills while other skills included in each game may be excluded from the FPS skill types.

In another embodiment, a virtual dojo may determine skill types that are not associated with any one game or game type. Skill types not associated with a game or game type may be determined by extracting data from user gameplay received in step 310 by analyzing interactions with objects in the object file 216 or by analyzing gameplay recorded in the content recorder 202, or any other data collected by a UDS in FIG. 2. Analyzing object interactions and recorded gameplay may determine skills not associated with any one game or game type including but not limited to camera angle usage, timing, dexterity, reflex or reaction time, and hand-eye coordination. For example, a reflex skill may be analyzed in an FPS game by recording how quickly a user reacts to an enemy appearing on-screen by measuring the time between the enemy appearing and when a user inputs the button command to fire a weapon. A reflex skill may also be analyzed in an Action game by measuring the time between a button prompt appearing on-screen for something such as a Quick-Time Event (QTE) and a user pressing the corresponding button input. In another example, a timing skill may be analyzed in a 2-D Fighting game by measuring the success rate of a user performing a combination attack that requires more than one different button input sequentially, with each subsequent input requiring different timing for the combination to be successfully performed. A timing skill may also be analyzed in a Racing game by measuring the success rate of a user turning a car around a corner without colliding with any other car or object that requires a user input a directional command for turning the car and a separate input for deceleration of the car at correct timings to complete the corner without collision successfully.

In step 330, the skill level of a user may be determined by a virtual dojo. Based on skill types determined in step 320, and user gameplay data received in step 310, a virtual dojo may determine skill level of a user in a variety of individual game skills, skills associated with a game type, and skills not associated with a game or game type. A user with no historic gameplay data available for a game skill, game type skill, or skills not associated with a game or game type may be compared to predetermined thresholds for each skill. Predetermined thresholds for skills of a user that is new to game, game type, or skill not associated with a game or game type may be set by a virtual dojo system, a developer or publisher of a game, an interactive content server 110, or a user device 130. A skill threshold may be set to various benchmarks including but not limited to success rate or failure rate of execution of an in-game action, number of skills executed successfully or failed to execute, and ranking of a user compared to other users in an activity. A skill threshold may have various tiers, levels or other grading system to determine different aptitudes for user skill in each game skill, game type skill, or skill not associated with a game. A determination may be made after a user interacts with a game skill, game type skill, or skill not associated with a game or game type and a skill level from the related skill tier may be assigned to the user.

An exemplary skill tier and assignment of skill level to a user may include measuring the success rate of a game skill such as a user completing an objective of a Stealth game without being detected by an enemy, where detection is considered failure, and completion without detection is considered success. The skill tier may be separated into 25% increment thresholds such as 0% to 25%, 26% to 50%, 51% to 75%, and 76% to 100% rate of success and given skill level denominations such as Beginner, Intermediate, Advanced, and Expert, respectively. For example, a user may attempt 20 objectives in a stealth game, and may be detected in 4 of the attempts, The user may be determined to be of an "Expert" level with an 80% success rate in the skill type.

In step 340, each game skill, game type skill, or skill not associated with a game or game type of a user determined in step 330 may be aligned with a trigger event. Trigger events may be set at a variety of thresholds different from thresholds set to determine user skill level and may produce different outcomes when engaged. Trigger events may be associated with an increase or a decrease in user skill in a particular game skill, game type skill, or skill not associated with a game or game type. Trigger events may also be associated with failures to execute a certain skill in a specific game. Thresholds for trigger events may be set to a predetermined value for a user with no historic gameplay data available for a particular skill. Predetermined thresholds for trigger events for a user that is new to game, game type, or skill not associated with a game or game type may be set by a virtual dojo system, a developer or publisher of a game, an interactive content server 110, or a user device 130.

In one embodiment, a trigger event may be detected upon a user failing the use of one in-game skill for the first time. Repeated failures to execute the same skill may continue to be detected as a trigger event with the same outcome or may trigger additional different events with different outcomes. For example, if a user fails the use of a skill that is necessary to progress in the game, a tutorial may be triggered to ensure the user does not become frustrated quickly. In one example, a user may interact with a Racing game for the first time. A user may accelerate the player vehicle into a corner on the racetrack too quickly and the car may overturn, causing the player vehicle to be immobile. A trigger event may be detected to display a tutorial that instructs the user to "Press X to flip the car". A user may continue to drive the player vehicle after pressing the appropriate button input, and upon the player vehicle entering another corner, the vehicle may overturn again. The same trigger even may be detected, and the same tutorial may be shown to the user, or the same trigger event may detect the repeated failure and provide a different tutorial which includes the button input to correct the vehicle orientation as well as recommendations on controlling the vehicle to avoid overturning.

In another embodiment, a trigger event may be detected upon a user repeatedly failing the execution of skills in a skill type of more than one game where the skills are associated with a game genre or game type. In such a case, the trigger event may include a predetermined threshold value for a count of failed attempts to use a skill type or a failure rate of skill executions from the associated skill type and game type.

In yet a different embodiment, a trigger event may be detected upon the increase or decrease in a player rank when compared to other players in the same game skill, game type skill, or skill not associated with a game or game type. A trigger event detected for an increase in player rank in a particular skill may disable detection of previous trigger events while a user maintains that rank in the skill. A trigger event detected for a decrease in player rank in a particular skill may enable detection of trigger events while a user maintains that rank in the skill. Other trigger events detected for a change in player rank in a particular skill may introduce various new triggers depending on the specific player rank and related skill type. For example, in one instance, a player rank in a skill may increase to an expert level. The trigger event for ranking up to the expert level in the skill may disable trigger events for recommendations related to the novice level in the same skill. In another instance, a player rank in a skill may decrease to an intermediate level, enabling trigger events related to advanced techniques that may help a user master the skill when a mistake is made. Further, a different trigger event may be detected in the case that a player rank in a skill repeatedly increases to one rank, then decreases again to the previous rank. Such a repeated ranking up and ranking down may indicate the user may be stuck or plateaued in the skill, and the trigger event may identify that the user requires new or different sets of information or training to advance the skill.

In step 350, a virtual dojo may provide a training curriculum based on the determined skill level and skill type of a user as previously identified in steps 310-340. Gameplay of a user recorded by a UDS and received by a virtual dojo in step 310 may be included in the training curriculum for use in review by a user or as part of training materials. Training curriculum provided to a user may be presented in various formats and styles, including but not limited to in-game maps, skill input look-up tables or controller sequences to execute a skill, tutorial videos or images with text, practice scenarios, and other displays of interactive and non-interactive media.

Training curriculum may be presented to a user and displayed on a number of devices, depending on the purpose or intended use of the material. Training curriculum may be displayed concurrently during continued play of a game, during a pause of gameplay, or separately and asynchronously from gameplay entirely. A first user device 130 utilized for play of a game may also alternatively display training curriculum and materials, or a second user device may be utilized to display the content during concurrent gameplay or asynchronously from gameplay.

In one embodiment, a training curriculum may include cross-functional skill training exercises that utilize the primary gameplay device or first user device 130 and input mechanism such as a controller, joystick or keyboard and mouse. Such exercises or practice scenarios may be suggested for a user by a virtual dojo in order to practice techniques related to but separate from the play of a game itself. For example, a user that is identified as a novice skill level in an FPS multiplayer game may be presented with cross-functional skill trainings that are applicable to many games in the FPS genre as to improve a core skill set and competency in one or more games. An FPS cross-functional training curriculum may include exercises, activities, and practice scenarios such as tracing (using only the crosshair to follow and shoot a moving target), strafing (moving the player character horizontally while shooting a stationary target), reflex shooting (moving only the crosshair to multiple targets in sequence of appearance and shooting as quickly and accurately as possible), as well as other similar trainings.

In another embodiment, a training curriculum associated with the gameplay of a user may be displayed on a second user device 130 concurrent to active gameplay on a first user device 130. A second user device 130 may include any number of devices separate from the active gameplay device, such as a touch-screen phone or tablet, display projector, or monitor. Training curriculum displayed on a second user device may include supplementary gameplay information including but not limited to examples such as a map associated with gameplay of a user, input look-up tables for button sequences to execute skills, previously recorded gameplay of a user, and various other reference and practice materials. For example, a user struggling to navigate an in-game level that has previously been identified to repeatedly access a map menu may have the map of an area automatically displayed to a second device upon entering a new area. In another example, a user who has repeatedly failed to execute a button combination required to activate a skill may have the related input button information, a demonstration video, or a controller reference guide displayed automatically to a second user device.

In yet a different embodiment, a dashboard separate from gameplay may be generated and displayed to a user on a first or second user device. A user may navigate the dashboard menu to access a variety of training curriculum and related information associated with gameplay and a virtual dojo. Such access to a dashboard may allow a user to configure preferences of the training curriculum provided, enable or disable certain aspects of the suggested curriculum, manually select and engage in training activities or view related gameplay information and more. For example, a user may not be detected as having a low skill rating in an FPS game and may not automatically receive prompts to engage in cross-functional skill trainings such as tracing, strafing and reflex shooting. However, a user may optionally choose to engage in additional practice of such activities through the training curriculum dashboard associated with a virtual dojo on a first user device 130. Alternatively, a user that is identified as having a low skill level and does receive prompts to engage in training exercises may follow on-screen instructions to view and participate in the cross-functional exercises from the dashboard.

In a different example, a user may find reference materials such as maps, button sequences or input look-up tables to be helpful or make a game more enjoyable even if they have not been identified as failing execution of skills or having difficulty navigating a level beyond a predetermined threshold. In such a case, a user may access the training dashboard on either a first or second user device and choose to display such supplementary materials on the second device.

Steps 310-350 may be performed by the system repeatedly as user gameplay continues over one or more gameplay sessions in one or more games. After initially analyzing gameplay of a user, determining skill level, determining skill types used, setting thresholds and related trigger events for training curriculum, and providing training exercises via a curriculum, the system may continually receive additional data and revise any determination previously detected. Repeating steps 310-350 may allow the system to determine various changes to training curriculum such as a user engaged in one or more related game types and skill sets requiring additional training, updating and calibrating thresholds and trigger events upon successful completion of related skills or additional failures of skill executions, providing new cross-functional training opportunities, matchmaking a user with peers similar in skill level or complimentary skill type that a user may train or practice with together, and determining gameplay style of a user. In one embodiment, a user may be provided with input look-up tables for a game due to failure to execute one or more skills repeatedly in a first game session. In a subsequent game session, a user may consecutively or consistently successfully input button sequences and execute the intended skill. The training curriculum for the user may be updated to reflect no additional need for suggesting use of tutorials or input guides as the user skill execution success rate improves. Simultaneously, a user skill level and skill type may be updated to reflect additional proficiency in related skills.

In a different embodiment, a user may be presented a training curriculum that includes cross-functional introductory FPS techniques and skill exercises. In subsequent play of a related FPS game, the system may detect incorporation of the techniques in a gameplay of a user. The system may further suggest new cross-functional training related to more advanced techniques, game specific exercises, and other various tutorials reflecting progression in the discipline.

In another embodiment, one or more massively multi-player role-playing games (MMORPG) may be played by a user. Such games typically include user-selected character preferences and styles of gameplay used in multiplayer modes or scenarios. For example, a user may choose to play a "Tank" character that exhibits strong resistances to damage from enemies, protects teammates by attracting enemy attention, but outputs less damage to enemies than other character archetypes may be capable of outputting. A user may interact with a new MMORPG title, create a new player character and search for other users to play with in team scenarios. The system may determine other users that are complimentary in skill and preference to a user for team scenarios based on a user gameplay style of choosing "Tank" characters and having an above average skill level in other MMORPG titles, and may suggest the other users as teammates. Additionally, a user may choose to adopt a new character archetype in such an MMORPG and begin playing a damage output focused character, or "DPS" (damage-per-second). The system may identify related training curriculum that is designed to help the user adapt to a new playstyle that is different from their typically selected gameplay style.

The foregoing descriptions are merely presented as example cases depicting how a virtual dojo system may be implemented. Various other gameplay aspects, skills, tutorials, curriculum, and similar implementations not stated may be provided to improve enjoyment and aptitude in media content for a user. The following descriptions and depictions included in FIG. 4 through FIG. 12 are included to further illustrate some tangible examples of the method for implementing a virtual dojo.

Figure 4:
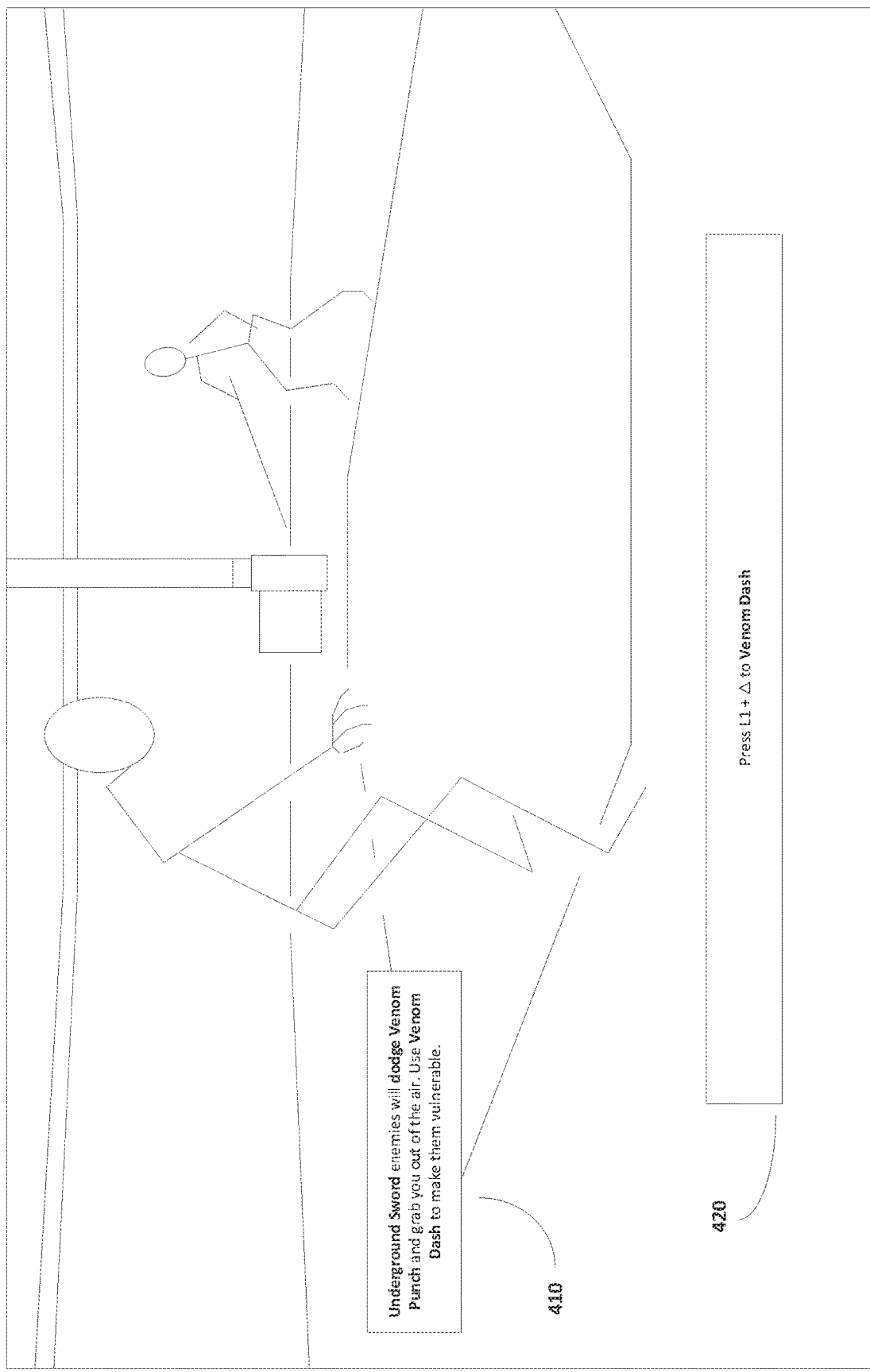
FIG. 4 illustrates an exemplary graphical user interface (GUI) in which custom training information may be displayed during gameplay.

FIG. 4 illustrates an exemplary graphical user interface (GUI) in which custom training information may be displayed during gameplay. Throughout the course of gameplay, a user may receive information on-screen of a first user device to guide the user to understanding some content of a game.

In one embodiment, a user gameplay is paused automatically and tutorial text, controller button information, images, video demonstration or other additional resource information such as a map or button combination guide is displayed overlaying the current paused gameplay. A prompt is shown to execute one or more inputs once a user has read, watched, or otherwise consumed the information. Execution of the one or more inputs by a user may "complete" a tutorial or training, confirm that information has been understood, and remove the overlaid information from the screen, resuming gameplay. The same tutorial, training, or information may be accessed subsequently from a pause menu, home screen, or other navigation screen of a game from a first user device.

In the present system, the execution and completion of such a tutorial, training or other information may automatically send the same or similar tutorial, training or other relevant information to a second user device, such as a smartphone, tablet, personal computer, or other digital display. For example, as illustrated in FIG. 4, gameplay is paused as a new gameplay skill is explained to a user with text 410 and a prompt is shown to press two buttons simultaneously (L1+Δ) by an on-screen tutorial 420 that automatically interrupts gameplay on a first user device. Upon successful execution of the required input, a second user device such as a smartphone may be automatically sent the displayed tutorial information as gameplay continues on a first user device where the tutorial was originally displayed.

In another embodiment, a user may disable automatic sharing of tutorial or training information to a second user device and may instead manually select when to forward and display information to a second user device via an in-game menu as to control the flow of information required on a second device. For example, the tutorial displayed in FIG. 4 may not be information the user currently requires to be reminded of if the information is typical or easy to remember for a user. However, further additional information such as a series of button combinations, a complex map, or other detailed piece of information may be more valuable to display on a second user device, at which point the user may select to display that information with priority.

In yet a different embodiment, the virtual dojo, UDS, or any combination of the systems described herein may selectively measure user response to gameplay mechanics, object interaction, event history, or any other such gameplay data to determine when a user is struggling due to missing information that was previously provided or is accessible via some menu outside of gameplay. The virtual dojo may further incorporate additional data into the assessment of such measurement and analysis of a user gameplay, such as historic properties of a user related to their perceived skill or success in one or more games or game mechanics. User skill level and historic gameplay information may determine whether a virtual dojo trigger is detected and activated. If such a detection occurs, the virtual dojo may selectively automatically share a tutorial, training or other resource to a second user device in order to assist the user. For example, a user may be presented the on-screen tutorial in FIG. 4, and successfully complete the tutorial. However, in further gameplay, the user may be detected repeatedly failing similar but incorrect inputs, such as inputting L1+◯ or some other two-button combination instead of L1+Δ, at which point the virtual dojo may automatically provide the tutorial to a second device, such as a smartphone or tablet. The information provided by the virtual dojo to a second device may be the same as the original resource or may include additional information to clarify for the user. For example, the tutorial illustrated in FIG. 4 may not be helpful in guiding the user to the correct input with only the given information simply by restating the label of the inputs that should be pressed simultaneously. Instead, the virtual dojo may modify the tutorial that was provided in FIG. 4 to also include a display of the controller and button mappings, with the required inputs highlighted, better illustrating to the user the location of each input rather than only a label or title of the input.

Figure 5:
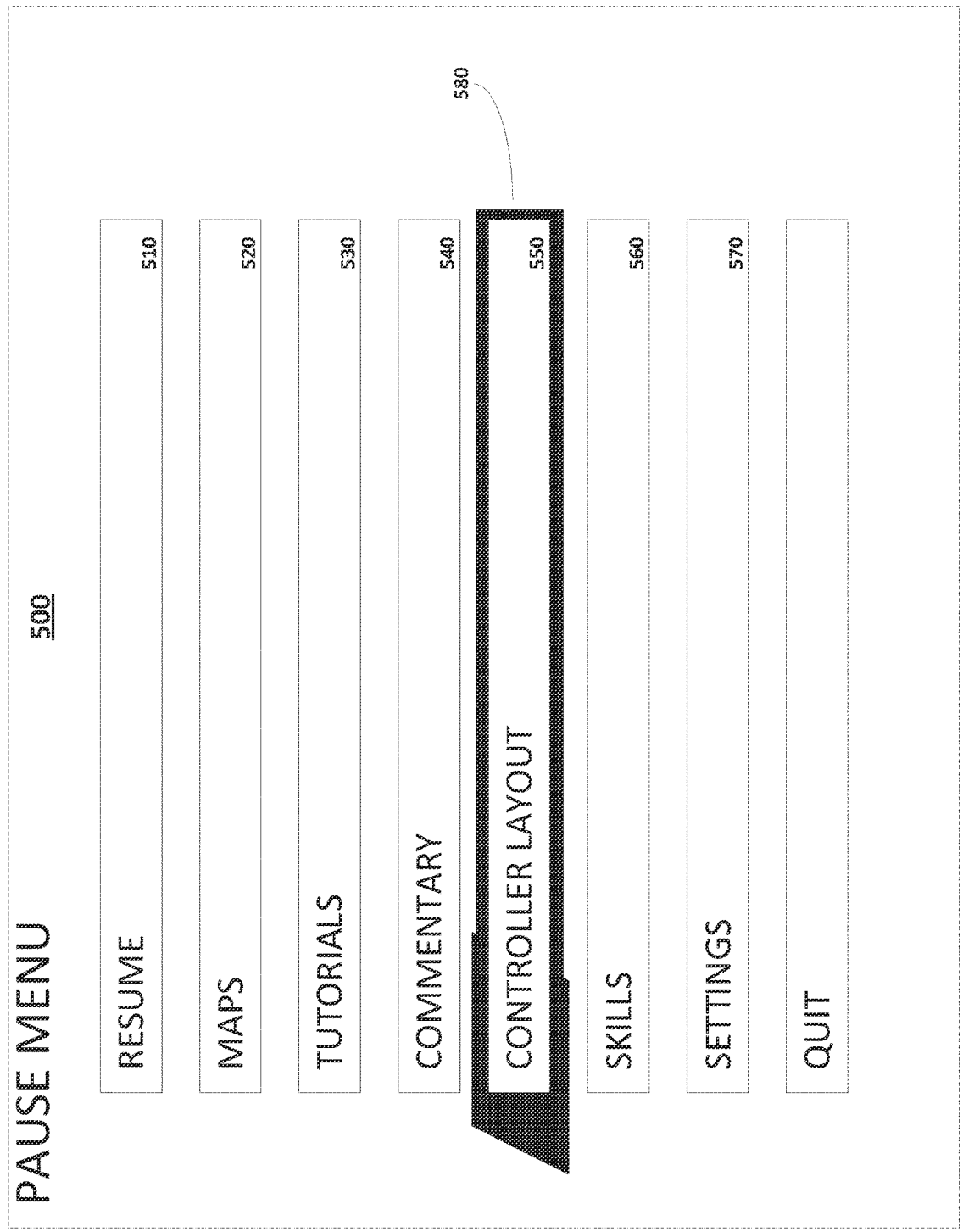
FIG. 5 illustrates an exemplary menu of training materials displayed via a GUI.

FIG. 5 illustrates an exemplary menu of training materials displayed via a GUI. A user may provide some input to access a menu 500 and pause or stop gameplay. Within a selected menu a user may access one or more options related to a virtual dojo. In one embodiment, a virtual dojo menu may be implemented as an entirely separate sub-section of a menu such as a menu item from a pause screen labeled "Virtual Dojo Settings". As illustrated in FIG. 5, a user may select a variety of options related to gameplay or a virtual dojo such as resuming gameplay from the pause menu 510, maps associated with gameplay 520, tutorials of skills and other game systems 530, commentary related to gameplay or mechanics 540, a controller layout with button combinations or configured controls 550, skill trainings or tutorials 560, and virtual dojo or game settings 570. In FIG. 5, a user is shown selecting to view a controller layout 550 as highlighted by the cursor 580.

In another embodiment, settings or actions for sharing tutorial, training, or other resource information from a virtual dojo may be nested within or tethered to other menus or menu items. For example, a user may access a menu within a game labeled "tutorials" or "combos" or may access a map screen of the current in-game area. Within one or more menu selections, a button or input prompt may allow a user to send the content to a second device. Further, a user may be able to change additional settings for automated sharing with a virtual dojo from one or more of these menu screens such as settings 570.

Figure 6:
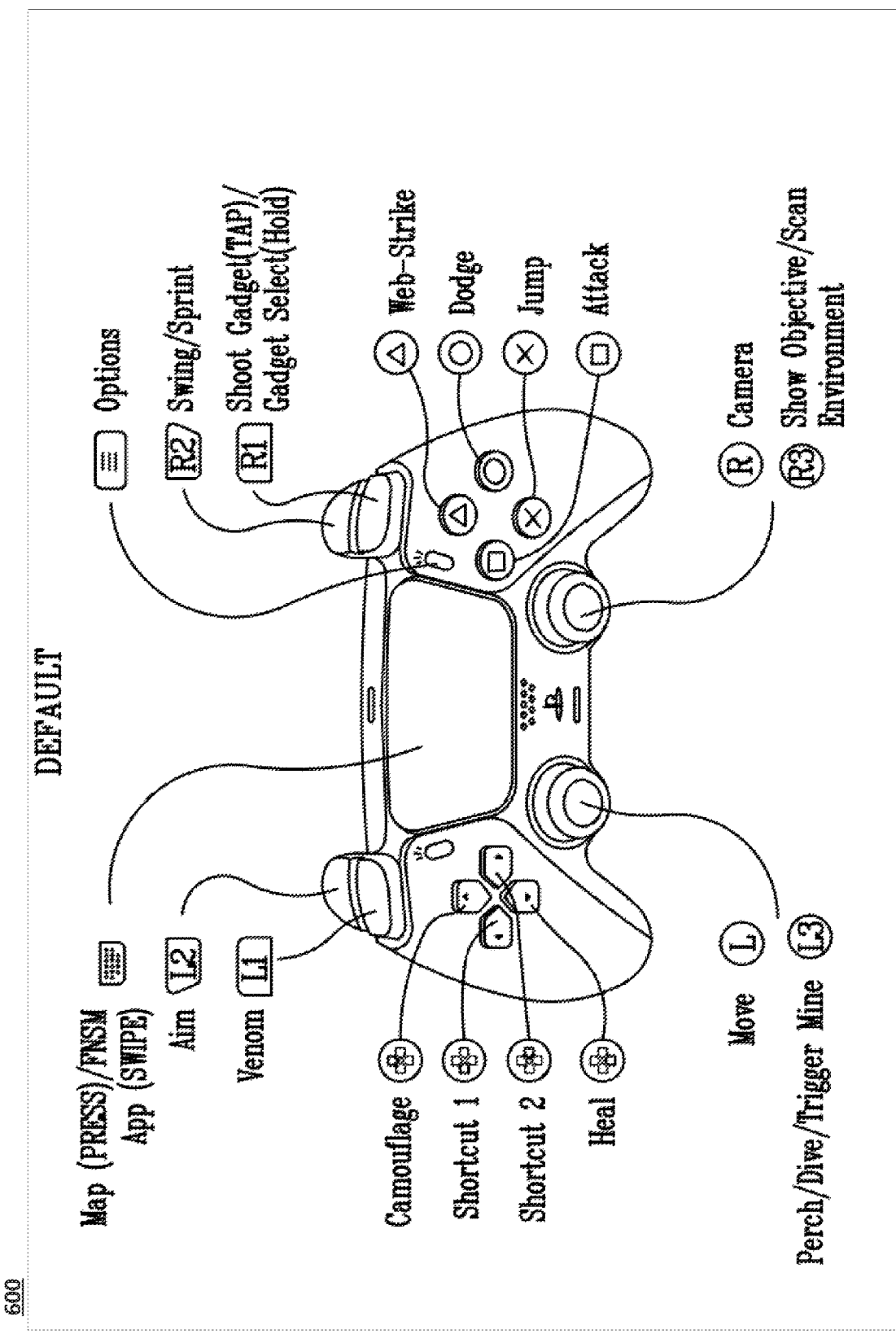
FIG. 6 illustrates an exemplary controller layout map displayed via a GUI.

FIG. 6 illustrates an exemplary controller layout map displayed via a GUI. In one embodiment, a user may send a slice of the gameplay related to the current specified game or title that a user is engaged with, such as a combo menu, map of an area, or specific skill tutorial for a character. As illustrated in FIG. 6, a user has selected to send a controller layout 600 displaying all the button inputs of a character for a particular game. While this information is displayed on a second user device, a user may continue gameplay on a first user device without any overlay or interruption on the first device.

In another embodiment, a user may execute a selection within a virtual dojo menu on a first user device that sends a cross-functional tutorial, training, or other resource to a second user device. A user may want to practice a certain skill or mechanic that translates between different game titles, or within a particular genre, rather than relating only to a single game. The virtual dojo, UDS, or any other combination of systems described herein may also detect engagement with one or more games that are from a same genre, or exhibit similar gameplay mechanics such as a user has engaged in more than one 2-D fighting game such as Street Fighter 5 and Guilty Gear Strive. A virtual dojo may include tutorials and gameplay slices that assist in general gameplay mechanics that may transfer or be applicable to a plurality of games, as well as specific gameplay slices related to a single game.

For example, a user that has engaged with one or more 2-D fighting games may have spent an extended duration in one game with one specific character. The virtual dojo may detect that a user has been training to learn the attacks and combinations of a single specific character and may select to send tutorials, guides, combination information, or other additional content related to one character to a second user device. Simultaneously, the virtual dojo may also detect a user has engaged in a different 2-D fighting game. The virtual dojo may detect that in addition to specific character or game information, a user may benefit from cross-functional information, such as a tutorial on defense or blocking. A tutorial or gameplay slice may be sent to a second user device that allows a user to practice such a cross-functional skill that may be applicable to one or more games.

Further, in certain embodiments the tutorial or gameplay slice sent to a second user device by a virtual dojo may be accessed and utilized asynchronously with gameplay on a first user device. As illustrated in FIG. 6, a controller display or diagram displayed on a second device may be applicable during gameplay on a first device and may be beneficial to a user only at the same time as gameplay is occurring. However, a gameplay slice may allow a user to practice some skill or supply some information to the user on a second user device which may be utilized for training between gameplay sessions. For example, the previously described cross-functional tutorial or training gameplay slice to assist in defense or blocking in a 2-D fighting game may be applicable to all games in the genre, and a user may be able to practice the skill via the second device such as tapping a phone screen to practice timing or reactions to on-screen changes.

Figure 7:
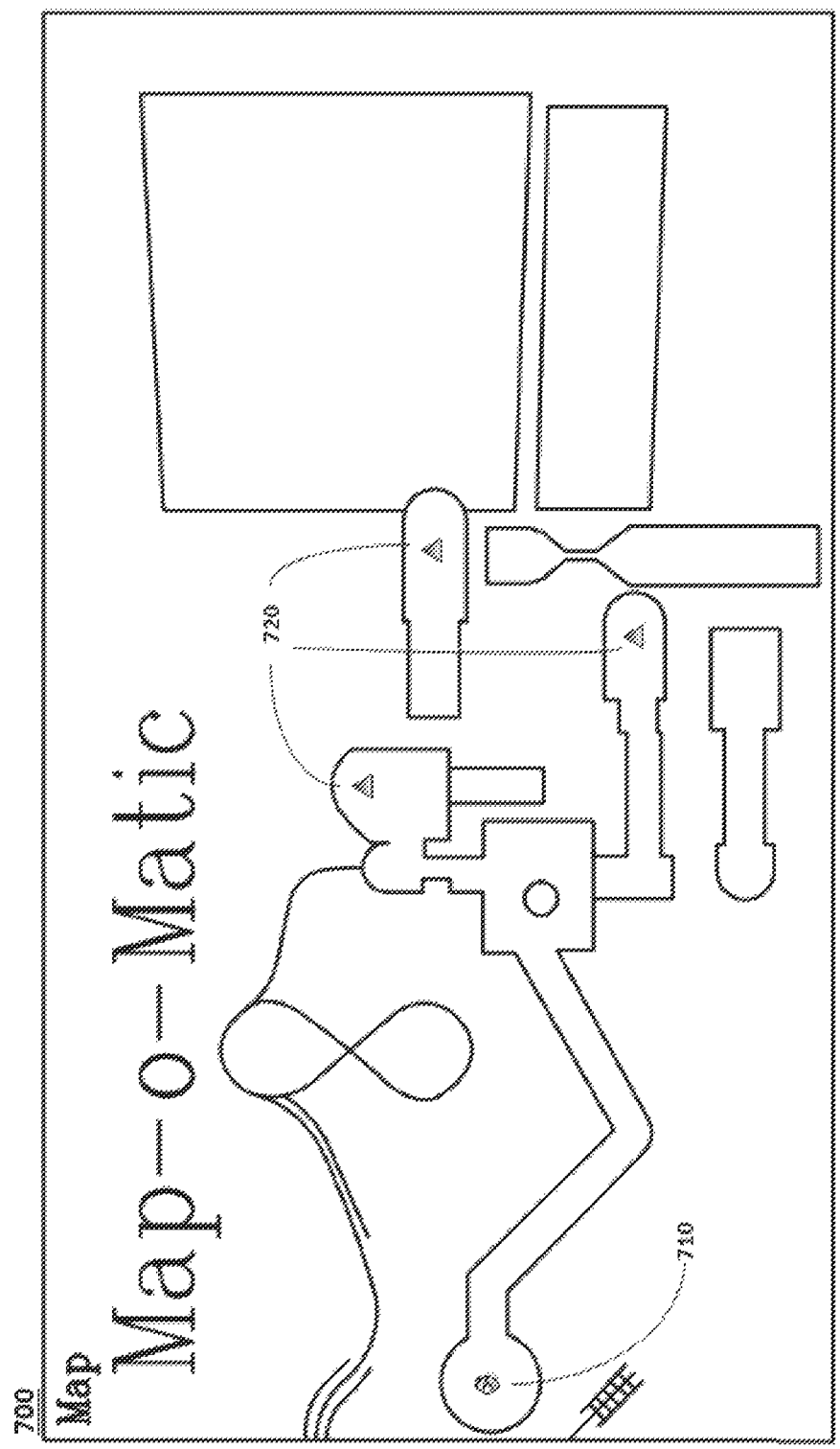
FIG. 7 illustrates an exemplary map of a virtual environment displayed via a GUI.

FIG. 7 illustrates an exemplary map of a virtual environment displayed via a GUI. As illustrated in FIG. 7, a map 700 may be displayed on a second user device to assist in navigation and identification of objectives while a user is engaged in play of a game on a first user device. A map 700 may be automatically shown to a user who has been identified previously in steps 310-360 as a below average navigator. While viewing a map on a second user device, a player character 710 may be shown in the current location of the player character. The location, orientation and other character information of a player may be automatically updated as the player moves throughout the game, as to accurately inform positioning and directional assistance. Further, reference objectives 720 may be shown on the map and may include a legend describing objectives or details of interactions available in an area.

Figure 8:
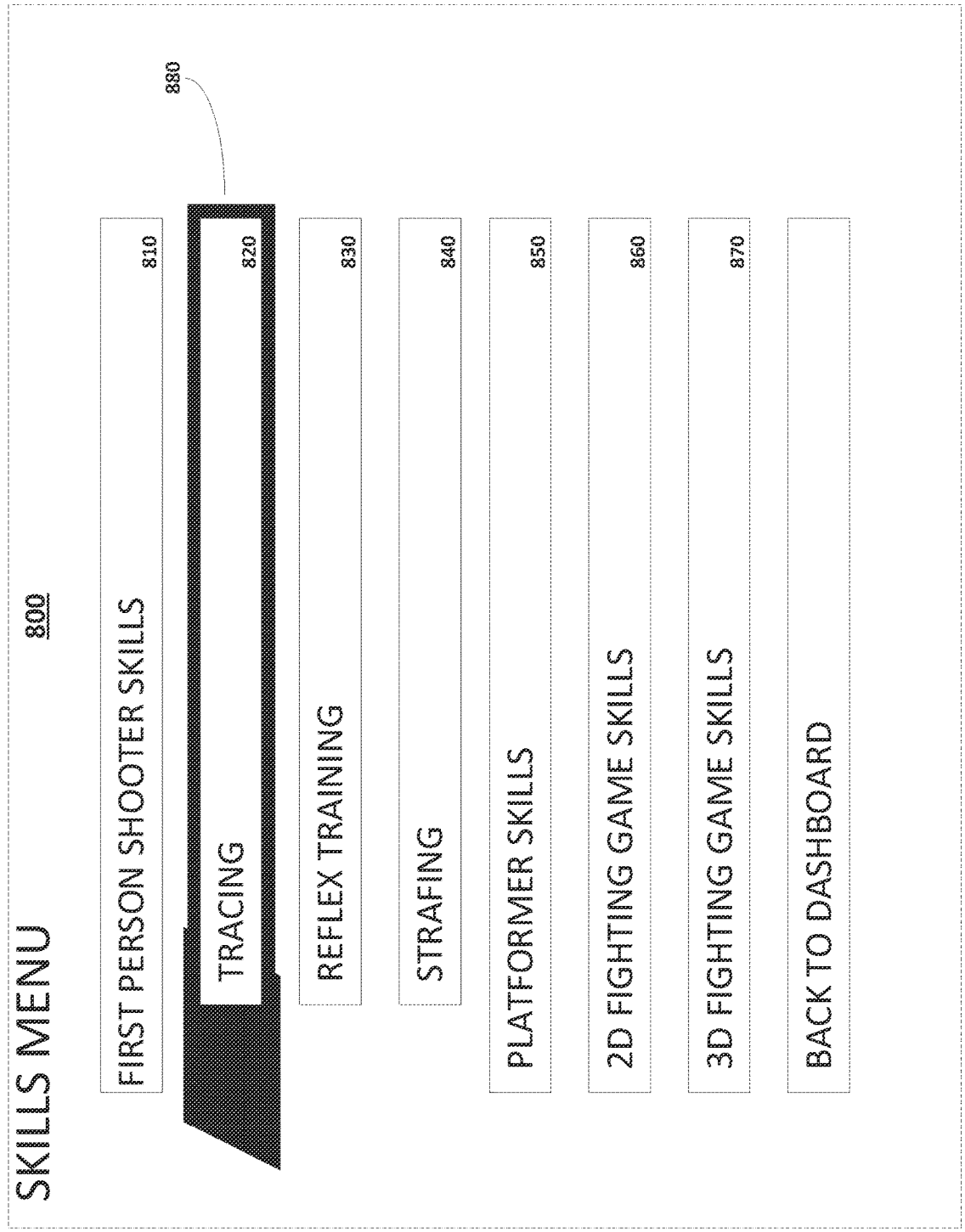
FIG. 8 illustrates exemplary sub-categories within a skill type displayed in a training dashboard via a GUI.

FIG. 8 illustrates exemplary sub-categories within a skill type displayed in a training dashboard via a GUI. In one embodiment a user may access a sub-menu of a game or virtual dojo such as "Skills" 800. A user may access an additional nested sub-menu of game-specific skills or cross-functional skills such as "First-Person Shooter Skills" 810. A user may select one or more tutorials or training sessions from a list which may be executed independently from any one game. A training session or tutorial may be engaged with and utilized by the user on a first user device, independently or asynchronously from any one specific game. As illustrated in FIG. 8 a user has selected with the cursor 880 a "tracing" tutorial 820 from the virtual dojo menu for first-person shooter skills. A variety of cross-functional skills may be available for training in a particular discipline or genre such as "reflex training" 830 or "strafing" 840, as each pertain to the First-Person Shooter skill category. A sub-menu of a virtual dojo for skill training may contain a variety of skills from different disciplines or game genres, such as platformer skills 850, 2D fighting game skills 860, or 3D fighting game skills 870 as well as other categories not listed. A user may manually select training and tutorial information from this list or may have certain activities prioritized and displayed by a virtual dojo based on player skill detected in related games.

Figure 9:
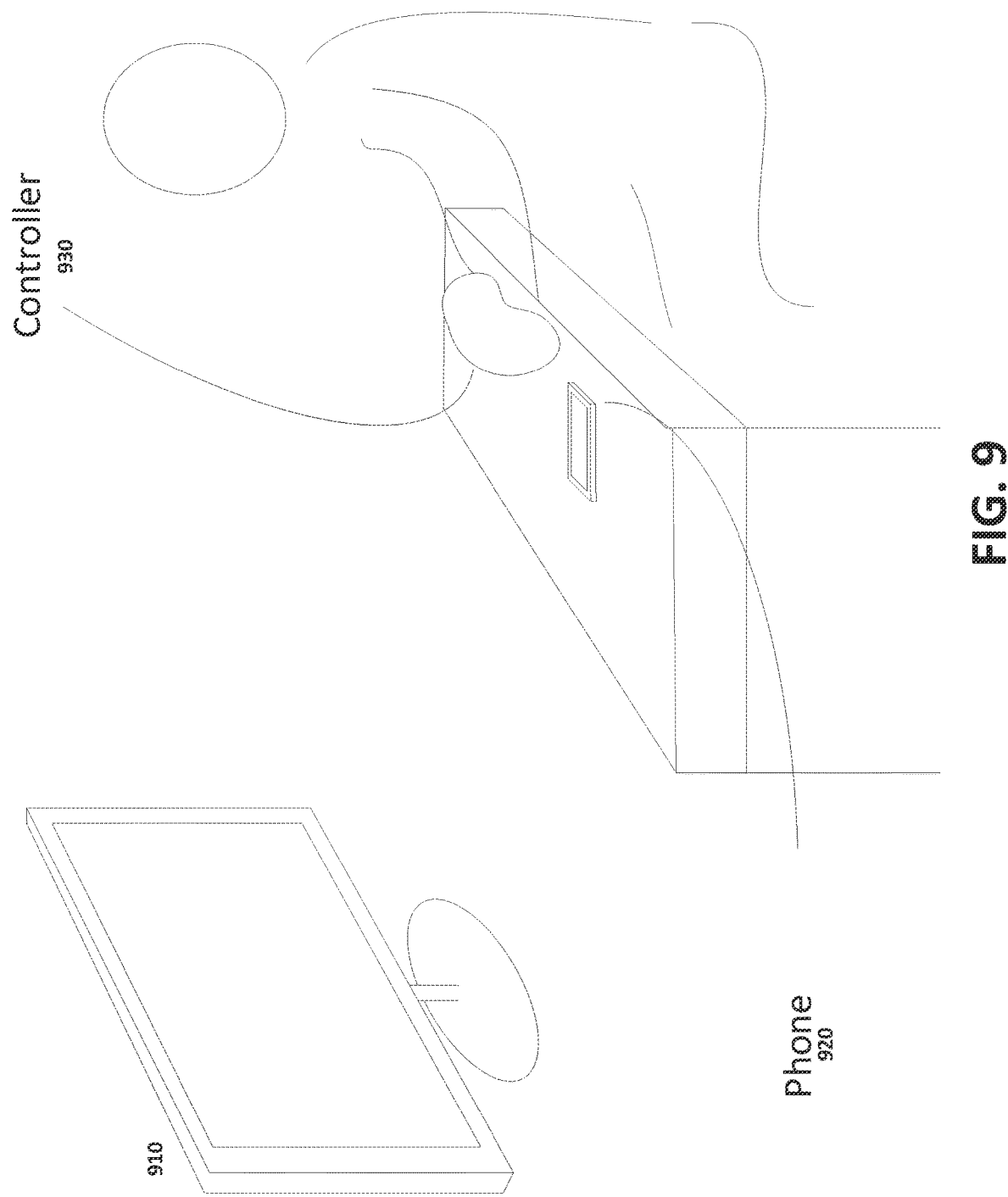
FIG. 9 illustrates an exemplary implementation of custom training curricula on multiple user devices.

FIG. 9 illustrates an exemplary implementation of custom training curricula on multiple user devices. In one such embodiment a user may access a tutorial or training module of the virtual dojo on a first user device, such as a "tracing", "strafing" or "reflex training" for first-person shooters. A user may interact with gameplay on a first user device related to the skill training while information, instructions, a demonstration video, or other resource information is shared to a second user device such as a smartphone. In another embodiment, as illustrated in FIG. 9, a user may interact with gameplay on a first user device 910 using a related input device such as a controller 930. Simultaneous to gameplay on a first user device 910, gameplay information may be displayed on a second user device such as a phone 920 and may include a variety of information related to an active gameplay session such as button inputs displayed in FIG. 6, or an in-game map as displayed in FIG. 7. Various tutorials, trainings, and other information may be displayed on a second user device 920 that are not required to be performed on a first user device 910.

Figure 10:
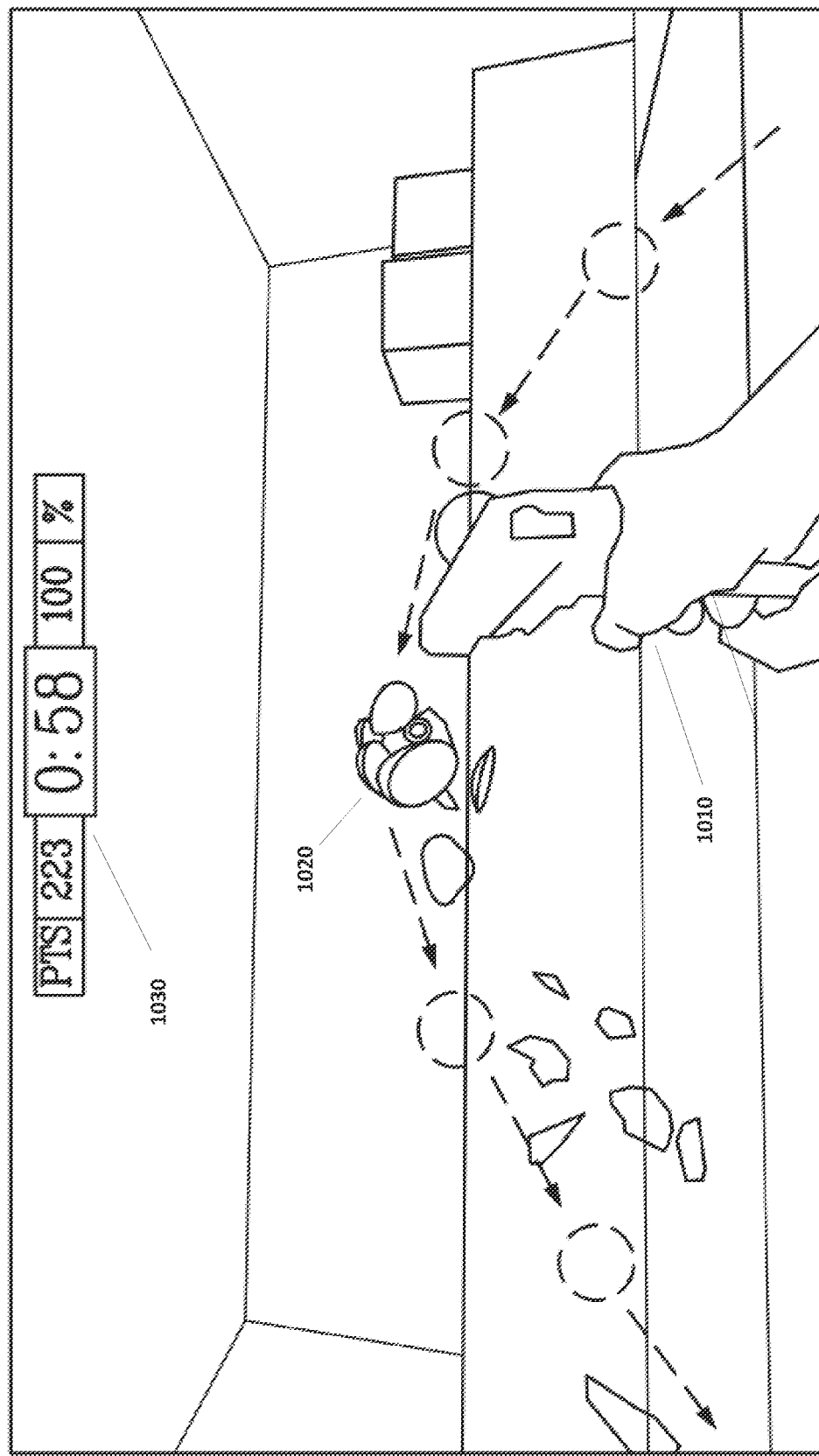
FIG. 10 illustrates an exemplary training exercise that may be accessed from a training dashboard.

FIG. 10 illustrates an exemplary training exercise that may be accessed from a training dashboard. As illustrated in FIG. 8, embodiments of virtual dojo trainings may include selecting cross-functional trainings to be engaged on a first user device as to improve cross-functional skills in each discipline or game genre. In one such embodiment, a user has selected to practice a first-person shooter skill such as "tracing" as illustrated in FIG. 10. Such a training may include a user controlling a stationary character in first-person view 1010 where the objective is to use the input device to follow a moving target 1020 and execute an input to shoot the moving target. In order to facilitate skill growth and inform the user of their progress in the current training, additional on-screen information 1030 may be displayed such as points associated with successful hits or skill executions, a timer, or an accuracy rating or percentage.

Figure 11:
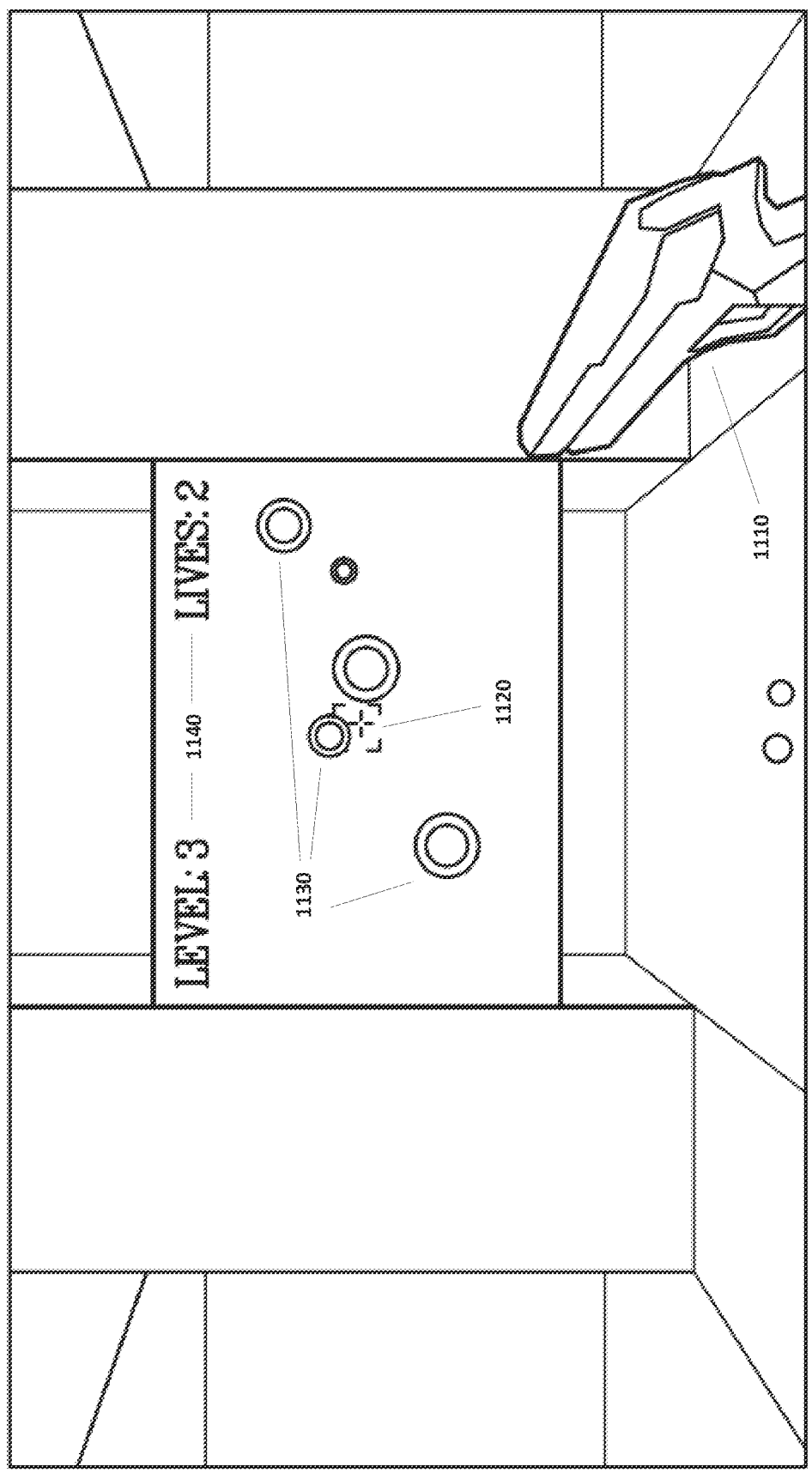
FIG. 11 illustrates an alternative training exercise that may be accessed from a training dashboard curriculum.

FIG. 11 illustrates an alternative training exercise that may be accessed from a training dashboard curriculum. As illustrated in FIG. 11, a user has selected a training such as "reflex training" as shown in FIG. 8. A stationary player character is shown from first-person view 1110. In such a training, the player may engage in inputting control of a cursor 1120 to move the cursor over targets 1130 that appear and grow in rapid succession in front of the player. Score and attempts 1140 may be shown to guide a user as to progress in the skill area or training. Such a training may focus on improving player skill and coordination in additional areas to training shown in FIG. 10 for the same genre of game. While a "tracing" training may focus on continued control of a cursor and button input for accuracy, a "reflex training" activity may focus on speed and decisiveness of actions selected by a user.

Figure 12:
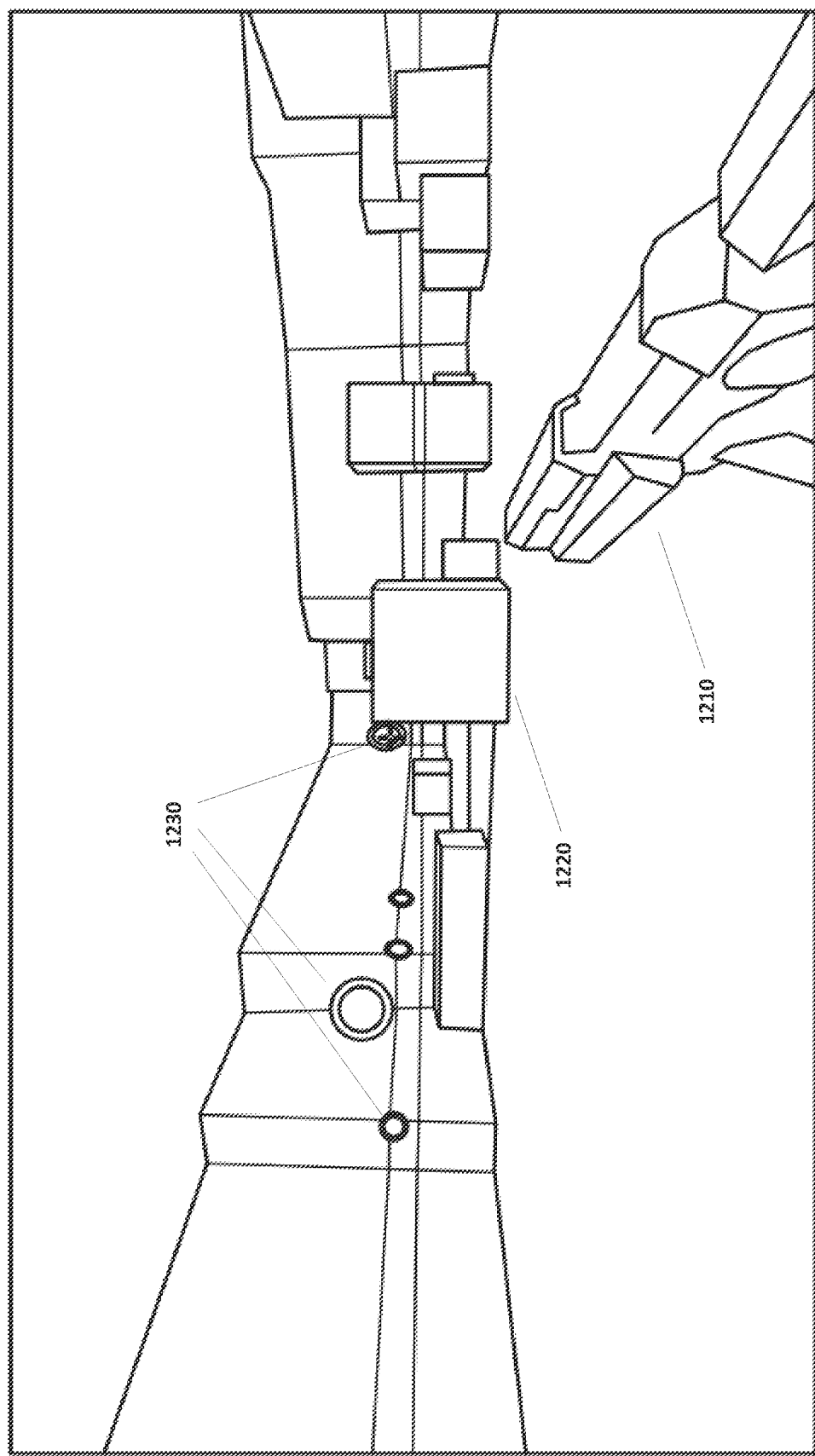
FIG. 12 illustrates yet another alternative training exercise accessed from the training dashboard.

FIG. 12 illustrates yet another alternative training exercise accessed from the training dashboard. Such cross-functional trainings may seek to improve a user control in multiple areas and aspects of a discipline. As illustrated in FIG. 12 a player character is again shown from first person view 1210. In this scenario, a user maintains full control over a player character and may traverse the level by walking or running using a different input than only an input aiming a cursor and an input firing a weapon. Such a "strafing" training may require a user walk or run to different angles in order to move around objects or barriers 1220 and engage targets 1230. Such a training builds on skills in other cross-functional trainings as depicted in FIG. 10 and FIG. 11, but introduces new skills and mechanics, further driving player growth in a genre or discipline by diversifying inputs required and combining previously practiced skills.

FIG. 10-12 represent some embodiments of cross-functional skill trainings on a first user device that also may alternatively be shared to a second user device. Such trainings may include a broad variety of skill types and game types not depicted and may include various differing versions for different user devices that utilize a control scheme or mechanism applicable to the device.

FIG. 13 is a block diagram of an exemplary electronic entertainment system that may be used in embodiments of the present invention. The entertainment system 1300 of FIG. 13 includes a main memory 1305, a central processing unit (CPU) 1310, vector unit 1315, a graphics processing unit 1320, an input/output (I/O) processor 1325, an I/O processor memory 1330, a controller interface 1335, a memory card 1340, a Universal Serial Bus (USB) interface 1345, and an IEEE interface 1350. The entertainment system 1300 further includes an operating system read-only memory (OS ROM) 1355, a sound processing unit 1360, an optical disc control unit 1370, and a hard disc drive 1365, which are connected via a bus 1375 to the I/O processor 1325.

Entertainment system 1300 may be an electronic game console. Alternatively, the entertainment system 1300 may be implemented as a general-purpose computer, a set-top box, a hand-held game device, a tablet computing device, or a mobile computing device or phone. Entertainment systems may contain more or less operating components depending on a particular form factor, purpose, or design.

The CPU 1310, the vector unit 1315, the graphics processing unit 1320, and the I/O processor 1325 of FIG. 13 communicate via a system bus 13135. Further, the CPU 1310 of FIG. 13 communicates with the main memory 1305 via a dedicated bus 1380, while the vector unit 1315 and the graphics processing unit 1320 may communicate through a dedicated bus 1390. The CPU 1310 of FIG. 13 executes programs stored in the OS ROM 1355 and the main memory 1305. The main memory 1305 of FIG. 13 may contain pre-stored programs and programs transferred through the I/O Processor 1325 from a CD-ROM, DVD-ROM, or other optical disc (not shown) using the optical disc control unit 1370. I/O Processor 1325 of FIG. 13 may also allow for the introduction of content transferred over a wireless or other communications network (e.g., 4$, LTE, 3G, and so forth). The I/O processor 1325 of FIG. 13 primarily controls data exchanges between the various devices of the entertainment system 1300 including the CPU 1310, the vector unit 1315, the graphics processing unit 1320, and the controller interface 1335.

The graphics processing unit 1320 of FIG. 13 executes graphics instructions received from the CPU 1310 and the vector unit 1315 to produce images for display on a display device (not shown). For example, the vector unit 1315 of FIG. 13 may transform objects from three-dimensional coordinates to two-dimensional coordinates, and send the two-dimensional coordinates to the graphics processing unit 1320. Furthermore, the sound processing unit 1360 executes instructions to produce sound signals that are outputted to an audio device such as speakers (not shown). Other devices may be connected to the entertainment system 1300 via the USB interface 1345, and the IEEE 1394 interface 1350 such as wireless transceivers, which may also be embedded in the system 1300 or as a part of some other component such as a processor.

A user of the entertainment system 1300 of FIG. 13 provides instructions via the controller interface 1335 to the CPU 1310. For example, the user may instruct the CPU 1310 to store certain game information on the memory card 1340 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing custom gameplay training, the method comprising:
   storing a plurality of trigger events in memory, each trigger event associated one or more in-game conditions;
   receiving data sent over a communication network regarding gameplay of a user at a specified point within a media title that corresponds to a game type;
   identifying a skill level of a skill exhibited by the user based on the received data;
   determining that the identified skill level and the game type of the media title meet the in-game conditions of an identified one of the trigger events; and
   customizing a set of training materials for the user based on the identified skill level of the user upon detecting the identified trigger event.

2. The method of claim 1, wherein the received data includes activity data indicating a success rate in executing one or more in-game actions, and wherein identifying the skill level is based on the success rate.

3. The method of claim 1, wherein the received data includes a number of skills successfully executed by the user, and wherein identifying the skill level is further based on the number of the skills successfully executed by the user.

4. The method of claim 1, wherein the received data includes a ranking of the user in comparison to one or more other users, and wherein identifying the skill level is further based on the ranking.

5. The method of claim 1, wherein the trigger event includes a failure to execute the skill, and wherein the set of training materials includes a tutorial associated with the skill.

6. The method of claim 1, wherein the conditions of the trigger event include a threshold number of repeated attempts, and further comprising providing the set of training materials after the threshold number of attempts is met.

7. The method of claim 1, wherein the conditions of the trigger event include a threshold number of failed attempts at executing the skill, and further comprising providing the set of training materials after the threshold number of failed attempts is met.

8. The method of claim 7, further comprising:
   detecting that the user is engaged in gameplay of a second media title, wherein gameplay data associated with the gameplay of the second media title indicates one or more failures at executing the skill;
   identifying that the set of training materials to the user based on the skill had been provided during the gameplay of the media title; and counting the failures in the second media title against the threshold number of failed attempts.

9. The method of claim 7, further comprising calibrating the threshold number of failed attempts based on the determined skill level of the user.

10. The method of claim 1, wherein the training materials include a recording of the gameplay during which the triggering event was detected.

11. The method of claim 1, wherein the training materials include a tutorial regarding controller sequences associated with executing the skill.

12. The method of claim 1, wherein the training materials include a map associated with a virtual environment of the media title.

13. The method of claim 1, wherein the training materials are presented during the gameplay of the media title.

14. The method of claim 1, wherein the training materials are presented during a pause in the gameplay of the media title.

15. The method of claim 1, further comprising analyzing the gameplay of the user to determine a gameplay style of the user, wherein customizing the training materials is further based on the gameplay style of the user.

16. The method of claim 1, further comprising providing the training materials to a second device while the user is engaged with the media title on a first device.

17. The method of claim 1, further comprising updating the skill level when the user successfully executes the skill a threshold number of times.

18. The method of claim 1, further comprising updating the training materials when the user successfully executes the skill a threshold number of times.

19. A system for providing custom gameplay training, the system comprising:

memory that stores a plurality of trigger events, each trigger event associated one or more in-game conditions;

a communication interface that receives data sent over a communication network regarding gameplay of a user at a specified point within a media title that corresponds to a game type; and a processor that executes instructions stored in memory, wherein the processor executes the instructions to:
identify a skill level of a skill exhibited by the user based on the received data;
determine that the identified skill level and the game type of the media title meet the in-game conditions of an identified one of the trigger events; and
customize a set of training materials for the user based on the identified skill level of the user upon detecting the identified trigger event.

20. A non-transitory computer-readable storage medium, having embodied thereon a program executable by a processor to perform a method for c providing custom gameplay training, the method comprising:

storing a plurality of trigger events in memory, each trigger event associated one or more in-game conditions;

receiving data sent over a communication network regarding gameplay of a user at a specified point within a media title that corresponds to a game type;

identifying a skill level of a skill exhibited by the user based on the received data;

determining that the identified skill level and the game type of the media title meet the in-game conditions of an identified one of the trigger events; and customizing a set of training materials for the user based on the identified skill level of the user upon detecting the identified trigger event.

* * * * *